United States Patent
Rehwald et al.

(10) Patent No.: US 11,365,709 B2
(45) Date of Patent: Jun. 21, 2022

(54) COMPONENT FOR A FUEL INJECTION SYSTEM AND METHOD FOR MANUFACTURING A COMPONENT OF A FUEL INJECTION SYSTEM

(71) Applicant: Robert Bosch GmbH, Stuttgart (DE)

(72) Inventors: Andreas Rehwald, Bietigheim-Bissingen (DE); Atanas Dimitrov, Vaihingen/Enz (DE); John Seifert, Kalkaska, MI (US); Klaus Lang, Stuttgart (DE); Waldemar Nussbaecher, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 16/065,975

(22) PCT Filed: Dec. 2, 2016

(86) PCT No.: PCT/EP2016/079580
§ 371 (c)(1),
(2) Date: Jun. 25, 2018

(87) PCT Pub. No.: WO2017/114636
PCT Pub. Date: Jul. 6, 2017

(65) Prior Publication Data
US 2019/0017479 A1    Jan. 17, 2019

(30) Foreign Application Priority Data
Dec. 29, 2015    (DE) .......................... 102015226807.1

(51) Int. Cl.
*B29C 53/08* (2006.01)
*F02M 55/02* (2006.01)
*F02M 55/00* (2006.01)

(52) U.S. Cl.
CPC ............ *F02M 55/02* (2013.01); *F02M 55/00* (2013.01); *F02M 55/005* (2013.01); *B29C 53/083* (2013.01); *F02M 2200/9053* (2013.01)

(58) Field of Classification Search
CPC ..... F02M 55/02; F02M 55/005; B29C 53/083
(Continued)

(56) References Cited

U.S. PATENT DOCUMENTS 2,724,891 A * 11/1955 Huet ...................... B21C 37/283
 29/890.147
2,774,384 A * 12/1956 Wallace .................... F28D 7/06
 138/177

(Continued)

FOREIGN PATENT DOCUMENTS

CN    103511139 A    1/2014
DE    10123234 A1    11/2002
(Continued)

OTHER PUBLICATIONS

International Search Report dated Mar. 2, 2017 of the corresponding International Application PCT/EP2016/079580 filed Dec. 2, 2016.
(Continued)

*Primary Examiner* — James F Hook
(74) *Attorney, Agent, or Firm* — Norton Rose Fulbright US LLP; Gerard Messina

(57) ABSTRACT

A component for a fuel injection system, in particular a high-pressure fuel injection system, includes a base body which is implemented in a tube-shaped manner at least sectionally. A tubular section of the base body is implemented having a longitudinal bending along a longitudinal axis of the tubular section which perpendicularly intersects the cross sections of the tubular section. At the longitudinal bending of the tubular section, the base body is implemented in such way that an ovality of the cross sections of the (Continued)

tubular section is reduced and/or smaller than 8% at the longitudinal bending.

5 Claims, 3 Drawing Sheets

(58) Field of Classification Search
USPC .............. 138/39, 177, 178, DIG. 9, DIG. 11
See application file for complete search history.

(56) References Cited

U.S. PATENT DOCUMENTS

| | | | | |
|---|---|---|---|---|
| 2,983,995 | A * | 5/1961 | Gresse | B21C 37/283 29/890.147 |
| 4,151,732 | A * | 5/1979 | Hofstede | B21D 7/162 72/16.4 |
| 4,784,651 | A * | 11/1988 | Hickey | A61M 25/0023 604/544 |
| 4,841,760 | A * | 6/1989 | Ferguson | B21D 9/12 72/133 |
| 5,094,096 | A * | 3/1992 | Sheckells | B21D 7/024 72/152 |
| 5,339,670 | A * | 8/1994 | Granelli | B21D 7/024 72/152 |
| 5,339,868 | A * | 8/1994 | Naoi | F16L 43/001 138/172 |
| 6,098,668 | A * | 8/2000 | Siwinski | F16L 19/00 138/177 |
| 6,287,508 | B1 * | 9/2001 | Stripe | B29C 53/083 264/570 |
| 6,309,588 | B1 * | 10/2001 | Powell | B29C 53/083 264/322 |
| 6,675,835 | B2 * | 1/2004 | Gerner | B01D 19/0031 138/26 |
| 7,810,524 | B2 * | 10/2010 | Sakazaki | F16L 11/04 138/137 |
| 8,127,799 | B2 * | 3/2012 | Cortez | F16L 55/1608 138/109 |
| 8,555,637 | B2 * | 10/2013 | Nakae | F02M 35/10111 60/605.1 |
| 2003/0127149 | A1 * | 7/2003 | Ooyauchi | B21C 37/06 138/177 |
| 2003/0192611 | A1 * | 10/2003 | Weck | F16L 11/12 138/118 |
| 2004/0075296 | A1 * | 4/2004 | Doi | B60J 5/0444 296/146.6 |
| 2004/0101416 | A1 | 5/2004 | Eck et al. | |
| 2010/0200100 | A1 * | 8/2010 | Lupke | F24F 13/0218 138/121 |
| 2011/0163179 | A1 * | 7/2011 | Lipson | A47G 21/182 239/33 |
| 2012/0055733 | A1 * | 3/2012 | Wheeler | F16L 9/21 181/212 |
| 2012/0325363 | A1 * | 12/2012 | Knebl | B29C 53/083 138/177 |
| 2015/0136084 | A1 * | 5/2015 | Maier | F02M 55/025 123/452 |

FOREIGN PATENT DOCUMENTS

| | | |
|---|---|---|
| JP | S6179619 A | 4/1986 |
| RU | 2209698 C1 | 8/2003 |
| WO | 2012/167881 A1 | 12/2012 |

OTHER PUBLICATIONS

Concise Practical Handbook about Sheet Metal, Zhu, Juexin (Ed.), Shanxi Sience and Technology Publishing House, 1999 (12), first edition, pp. 409-412.

\* cited by examiner (1) $\quad x = \dfrac{2 \cdot |D-d|}{D+d} \cdot 100\%$

COMPONENT FOR A FUEL INJECTION SYSTEM AND METHOD FOR MANUFACTURING A COMPONENT OF A FUEL INJECTION SYSTEM

CROSS-REFERENCE TO RELATED APPLICATIONS

The present application is the national stage of International Pat. App. No. PCT/EP2016/079580 filed Dec. 2, 2016, and claims priority under 35 U.S.C. § 119 to DE 10 2015 226 807.1, filed in the Federal Republic of Germany on Dec. 29, 2015, the content of each of which are incorporated herein by reference in their entireties.

FIELD OF THE INVENTION

The present invention relates to a component for a fuel injection system, in particular a high-pressure fuel injection system, a method for manufacturing a component of a fuel injection system, in particular a high-pressure fuel injection system, and a component which is manufactured using such a method. Specifically, the present invention relates to the field of fuel injection systems of motor vehicles in which highly pressurized fuel is, for example, distributed via a fuel distributor among multiple injectors and is injected by same preferably directly into the combustion chambers of an internal combustion engine.

BACKGROUND

A fuel high-pressure accumulator having an optimized geometry is known from DE 101 23 234 A1. The known fuel high-pressure accumulator includes a hollow base body equipped with multiple connecting openings. In order to increase the high-pressure strength of the fuel high-pressure accumulator, a reservoir of the base body has a cylindrical, elliptical, or polygonal cross section, the base body having a cylindrical, elliptical, or polygonal outer contour in its cross section.

SUMMARY

The present invention provides for an improved embodiment and functionality. In particular, a strength or resistance can be improved and maintained over the service life of the component.

In a fuel injection system, a fuel distributor, in particular a tubular fuel distribution rail, and a single-piece or a multi-piece tubing, which connects the fuel distributor to at least one pump on the one hand and to the generally multiple fuel injectors on the other hand, are provided.

Depending on the embodiment of the fuel injection system, also two and, in principle, also more fuel distributors can be provided which can also be connected to one another. Due to the limited installation space conditions in the engine compartment, it can occur, among other things, that components such as the tubing or parts thereof or a tubular fuel distributor are bent once or multiple times into one or multiple directions at one or multiple different bending angle(s). A tubular base body of the component at which such a bending takes place is also subjected during the bending to a deformation of its cross section in the area of the bending. For example, a tubular base body having a circumferentially constant wall thickness would have an oval cross section following the bending which results from plastic deformations of the material due to the tensile and compression forces acting during the bending. In general, the problem here is that the bending results in a fatigue of the material and the stiffness is reduced. The plastic deformation of the cross section, which is more or less ideally round, to an oval cross section, which has a circumferentially non-constant wall thickness, results in the strength of the tubular component being locally reduced. The stresses occurring during operation, which are caused by the hydraulic pressure or mechanical oscillations, for example, result in component aging over the service life and there is the risk of premature failure or at least a reduced service life due to the decreased strength caused by the bending.

Using more material to compensate for strength losses is not always practicable and always results in higher material costs. An optimization can therefore involve optimizing the strength obtained following the bending and using any given material. In particular, this can refer to the cross sections of the tubular section, which involves optimizing the wall thickness across the circumference. The material used for the base body may, for example, involve a stainless austenitic steel. The connecting parts used for sealing can also be designed therefrom in order to achieve a high corrosion resistance. Other materials can, however, also be used, in particular non-stainless steels which are coated using an anti-corrosion coating.

With regard to a start geometry to be optimized, a line can, for example, serve as a part of a tubing which has a circular cross section having an outer diameter between 4 mm and 10 mm as well as a wall thickness between 1 mm and 2.5 mm. Such a line is particularly suitable for conveying fuel in the case of internal combustion engines.

Even if the design of the component having an optimized geometry is particularly suitable for high-pressure fuel injection systems, the optimization can be used in general in high-pressure and low-pressure systems for gasoline, diesel, or other fuels for the purpose of optimizing the strength and thus maintaining the functionality over the service life. Specifically with regard to the stresses occurring during operation, such as the pressure and the mechanical shocks, material fatigue can be reduced over the service life, so that tears and the like are prevented from occurring.

One possible initial state of the base body prior to bending is provided by a geometric design of the base body in which the base body extends in a straight line and the longitudinal line of the tubular section runs in a straight line. A bending of the base body can take place in one or multiple sections. In the tubular sections, the cross section geometry of the base body is optimized in such a way that, with reference to the still occurring, but already established or predefined longitudinal bending, the reduced ovality of the cross sections of the tubular section is obtained at the longitudinal bending or a correspondingly limited ovality. In the initial state, this results in the wall thickness of the base body to become asymmetrically established across the circumference. The boundary conditions of this optimization are the desirable or the predefined bending angle for the longitudinal bending as well as the material usage, which is predefined in terms of surface area, for example, across the individual cross section areas. However, an optimization in terms of volume of the material usage is also possible.

Advantageously, the cross section of the base body has a maximum overall dimension in the initial state along the curvature direction of the occurring longitudinal bending. In an example embodiment, a maximum overall dimension along the curvature direction of the longitudinal bending there also results following the bending, i.e., in the final state in which the longitudinal bending is implemented at the base body. Here, it is understood that the curvature direction in general constantly changes correspondingly for consecutive cross sections. This embodiment has the advantage that compressions and extensions of the material are reduced in order to correspondingly limit material fatigue.

Example embodiments provide the advantage that the load on the material remains limited during the bending process. In an example embodiment, with regard to the axis along which the particular cross section has a maximum overall dimension and/or with regard to the axis along which the particular cross section has a minimum overall dimension, an axis-symmetrical implementation is achieved for at least one part of the cross sections following the occurred longitudinal bending. Here, it is understood that with regard to the tolerances of the base body and the process-induced variations minor, deviations can occur from an ideal-symmetrical implementation.

According to an example embodiment, there is a more restrictive optimization with regard to the ovality of the cross sections, in which case a disappearing ovality of the cross sections can also be achieved in the case of any given longitudinal bending, which corresponds to a circular contour of the cross section.

Example embodiments provide a particularly advantageous optimization because a reduction of the stability loss potentially occurring during bending is particularly critical for these embodiments. In such embodiments, in particular, it can thus be achieved that the strength is improved particularly well and therefore the functionality is ensured over the service life.

Example embodiments allow for the wall thickness to be optimized with regard to the achieved strength and for the same to be maintained over the service life of the component.

Example embodiments provide the component with the longitudinal bending, where the ovality of the cross sections of the tubular section is reduced at the longitudinal bending(s) and/or is correspondingly delimited. Example embodiments provide a method that involves modifications or optimizations of the tubular base body being carried out in an initial state in order to achieve, following the bending, the reduced and/or delimited ovality of the cross sections of the tubular section at the longitudinal bending. Preferred exemplary embodiments of the present invention are explained in greater detail in the following description with reference to the appended drawings, in which corresponding elements are provided with matching reference numerals.

DETAILED DESCRIPTION

Figure 1:
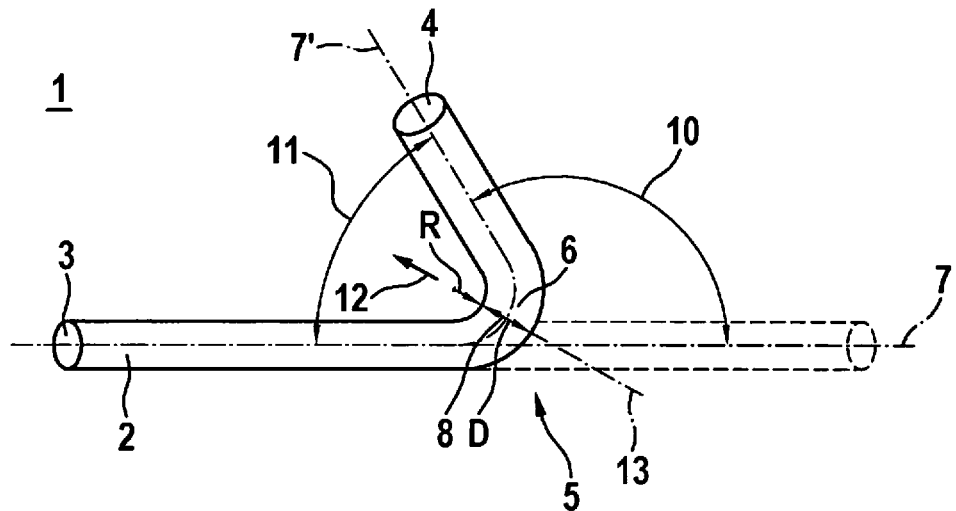
FIG. 1 is a diagram that illustrates a tubular base body of a component having a longitudinal bending, according to an example embodiment of the present invention.

FIG. 1 shows a component 1 including a tubular base body 2 for a fuel injection system. Component 1 can be in particular used for a high-pressure fuel injection system. In a modified implementation, tubular base body 2 can also be tubular only sectionally. In particular, tubular base body 2 can be closed at one of its ends 3, 4. Component 1 can be in particular a fuel line 1, ends 3, 4 being open in this case. Component 1 can, however, also be a fuel distributor 1 or another component 1 for a fuel injection system.

Tubular base body 2 has a tubular section 5 at which a longitudinal bending 6 is implemented.

In one initial state, tubular base body 2 can extend in a straight line, a longitudinal line 7 running in a straight line. After longitudinal bending 6 has been implemented, a bent longitudinal line 7' results. Tubular base body 2 has cross sections 8 along longitudinal line 7' which are perpendicularly intersected by longitudinal line 7'. One cross section 8 is identified by way of example in this case. Cross section 8 is located in this case at longitudinal bending 6 of tubular base body 2.

In this exemplary embodiment, a bending angle 10 is predefined and implemented following the bending. This results in an opening angle 11 of longitudinal bending 6 between the two legs of bent longitudinal line 7'. A bending radius R is furthermore predefined. A cylinder having bending radius R, about which tubular base body 2 is bent, can be used for bending, for example, to produce longitudinal bending 6.

However, not necessarily is one single curvature predefined for longitudinal bending 6. A curvature of longitudinal bending 6 can also vary along longitudinal line 7'. A curvature direction 12 potentially identifies the local direction of the curvature of longitudinal line 7'. Curvature direction 12 lies in this case in the plane of cross section 8 and is oriented perpendicularly to longitudinal line 7' in this exemplary embodiment.

Curvature direction 12 thus lies on an axis 13 of cross section 8 in this exemplary embodiment. In this exemplary embodiment, cross section 8 has a maximum overall dimension D along axis 13.

Figure 2:
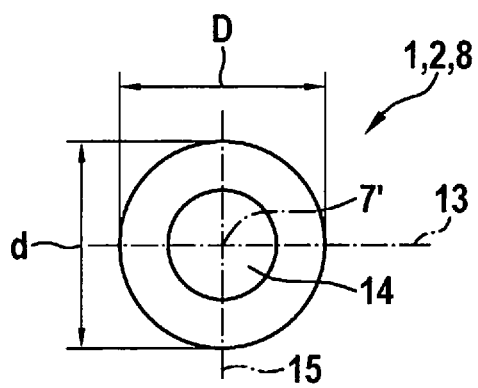
FIG. 2 shows a cross section of the tubular base body of FIG. 1 and having a longitudinal bending according to an example embodiment of the present invention.

FIG. 2 shows cross section 8 of tubular base body 2 of component 1 illustrated in FIG. 1 at longitudinal bending 6 according to one possible embodiment for the purpose of explaining the present invention. Tubular base body 2 has an inner space 14 through which, for example, a fuel can be conveyed along longitudinal line 7'. Axis 13 in which maximum overall dimension D lies and an axis 15 in which a minimum overall dimension d lies intersect here on longitudinal line 7'. Furthermore, the two axes 13, 15 on which overall dimensions d, D lie are oriented perpendicularly in relation to each other in this exemplary embodiment.

An ovality x is contemplated here as a percentage value. The computation of ovality x is yielded in this case from a fractional value according to formula (1) illustrated in the drawings. The dividend of this fractional value is yielded from multiplication factor 2 and the amount value of the difference between maximum overall dimension D and minimum overall dimension d. The divisor is yielded from the sum of maximum overall dimension D and minimum overall dimension d. For illustrating that ovality x is contemplated here as a percentage value, this fractional value can be further multiplied by 100%, as indicated in formula (1).

In the limit case of a circular outer contour, maximum overall dimension D is equal to minimum overall dimension d, so that ovality x disappears.

Figure 3:
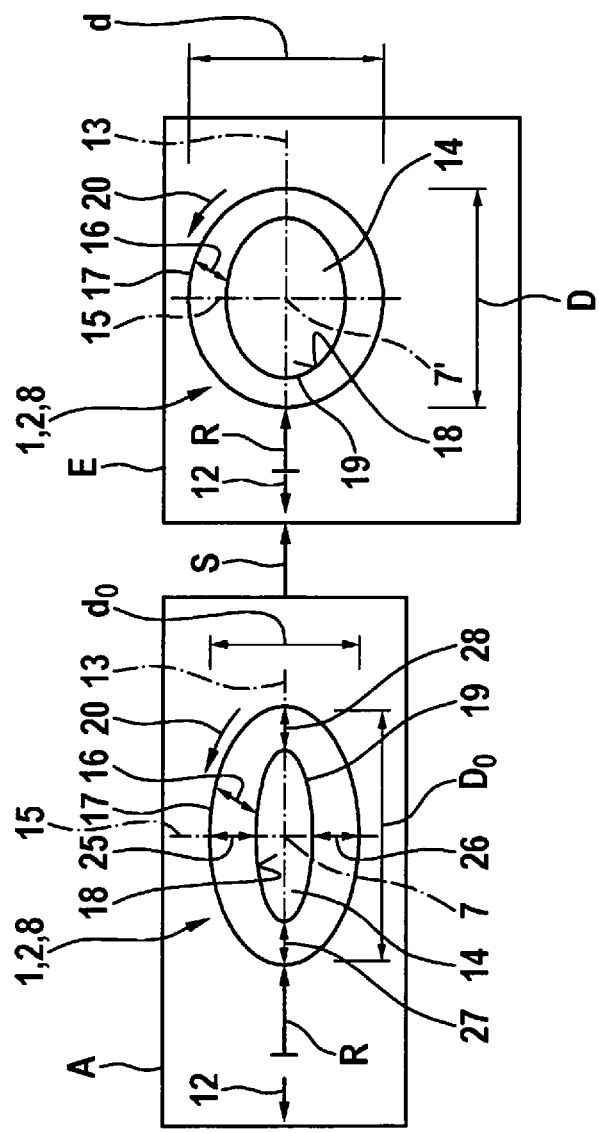
FIG. 3 illustrates a process sequence in a schematic illustration, according to an example embodiment of the present invention.

FIG. 3 shows a process sequence in a schematic illustration for the purpose of explaining the present invention. Here, an initial state A and a final state E are illustrated for the sake of simplification. A process step S of the method for manufacturing component 1 of the fuel injection system includes at least one method step in which a tubular section 5 of base body 2 is bent along longitudinal line 7 of tubular section 5 for implementing a longitudinal bending 6.

The method for manufacturing component 1 moreover relates to initial state A prior to the implementation of longitudinal bending 6. In initial state A, tubular base body 2 can extend, for example, along longitudinal line 7 shown in FIG. 1. A bending radius R and bending angle 10 or opening angle 11 are already established prior to process step S. Another parameter is the desirable material usage which is also established in this case and represents a boundary condition. A higher material usage allows in itself for a higher strength and thus additional influencing. In the following explanation, the material usage is, however, assumed as already established.

In this exemplary embodiment, cross section 8 is developed from an oval base shape. A wall thickness 16 identified by way of example is varied across the circumference. Furthermore, an initial maximum overall dimension Do and an initial minimum overall dimension do are modeled. The oval start shape of the cross section can, for example, be delimited by an elliptical outer contour 17. A wall 18 delimiting inner space 14 can be modeled by an elliptical inner contour 19. Here, it is understood that a variation of cross section 8 is additionally possible along longitudinal line 7. In particular, tubular base body 2 can be implemented in the shape of a hollow cylinder beyond longitudinal bending 6.

With the aid of a model computation and/or tests, in particular initial maximum overall dimension $D_0$, initial minimum overall dimension $d_0$, and the variation of wall thickness 16 can be determined in a circumferential direction 20 in such a way that in the final state E, a desirable implementation and in particular a reduced ovality x and/or an ovality x which is delimited by a certain value are achieved.

For this purpose, in initial state A, axis 13, in which initial maximum overall dimension $D_0$ and, following process step S, also maximum overall dimension D lie, is oriented along curvature direction 12 in this exemplary embodiment. Axis 15, in which initial minimum overall dimension $d_0$ and, following process step S, also minimum overall dimension d lie, is predefined here as being perpendicular to curvature direction 12 or perpendicular to axis 13.

Moreover, a variation of wall thickness 16 is implemented across the circumference, i.e., in circumferential direction 20. Here, a constant and, in this case, also continuous variation of wall thickness 16 is implemented. Constant means in this case that no abrupt changes in wall thickness 16 are implemented as viewed in circumferential direction 20. The uniform change in wall thickness 16 across the circumference prevents voltage peaks.

Moreover, two opposite maximum wall thicknesses 25, 26, which are equal in this case, result on axis 15. Furthermore, two opposite minimum wall thicknesses 27, 28 result on axis 13.

In this way, an optimized strength of component 1 can be achieved following process step S in the case of any given material usage. For this purpose, an at least approximately disappearing ovality x is achieved in final state E in this exemplary embodiment. Since the material usage directly influences the weight of component 1, the method can also be seen in the way that with regard to a desirable strength, an optimization of the component weight takes place through preferably little material usage. In this contempla-tion, the process parameter of material usage is reduced to the extent that the required strength is just achieved in final state E in the case of optimized geometry.

Moreover, a decreased wall thickness 16 allows for higher flexibility, so that an optimization is also possible in this regard. In general, a decreased wall thickness 16 following process step S results in a greater ovality x. For this reason, other initial geometries, which differ, for example, in initial overall dimensions $d_0$, $D_0$ and the variation of wall thickness 16 across the circumference, may be necessary in the case of other wall thicknesses 16, in particular decreased wall thicknesses 16.

The strength and durability of tubular base body 2 can thus be affected in different ways. In particular, cross section 8, in which ovality x is opposed in initial state A to the change which took place via process step S and is achieved in final state E, can in particular be implemented in initial state A to improve the strength with the aid of a locally delimited deformation or also a deformation taking place along entire longitudinal line 7 of cross section 8.

With regard to ovality x in final state E resulting from the corresponding bending of a body in the shape of a hollow cylinder, a reduction of ovality x can thus be achieved. Furthermore, an ovality x, which is smaller than 8%, preferably smaller than 5%, can be achieved in final state E. Essential advantages result in particular in the case of a bending angle 10 of more than 90° and/or a bending radius R or in the case of curvature radiuses of less than 20 mm.

Figure 4:
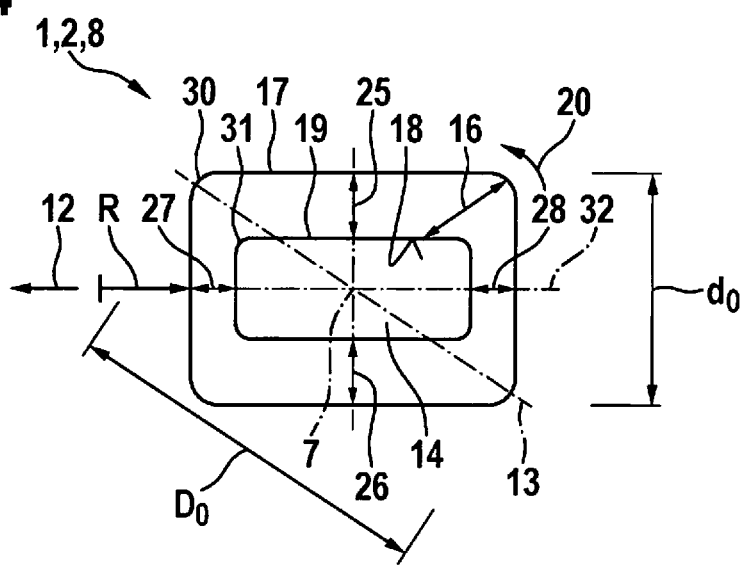
FIGS. 4 and 5 show respective cross sections of the tubular base body illustrated in FIG. 1 according to respective other example embodiments of the present invention.

FIG. 4 shows a cross section 8 of tubular base body 2 of component 1 illustrated in FIG. 1 according to another example embodiment of the present invention. Here, the embodiment, which is predefined according to the process sequence illustrated in FIG. 3, is illustrated in an initial state A. In this exemplary embodiment, cross section 8 is modeled starting from a rectangular hollow profile. Here, edge roundings 30, 31 are provided at outer contour 17 as well as at inner contour 19, of which edge roundings 30, 31 are identified in FIG. 4 by way of example. This results in a constant variation of wall thickness 16 in circumferential direction 20. Wall thickness 16 is contemplated in this case with reference to longitudinal line 7. In this exemplary embodiment, maximum wall thicknesses 25, 26 are also predefined in initial state A on axis 15 on which initial minimum overall dimension do lies. Minimum wall thicknesses 27, 28 lie on an axis 32 which extends along curvature direction 12. In this exemplary embodiment, axis 13 on which initial maximum overall dimension Do lies is not perpendicular to axis 15 on which initial minimum overall dimension do lies. A corresponding status results in final state E.

Figure 5:
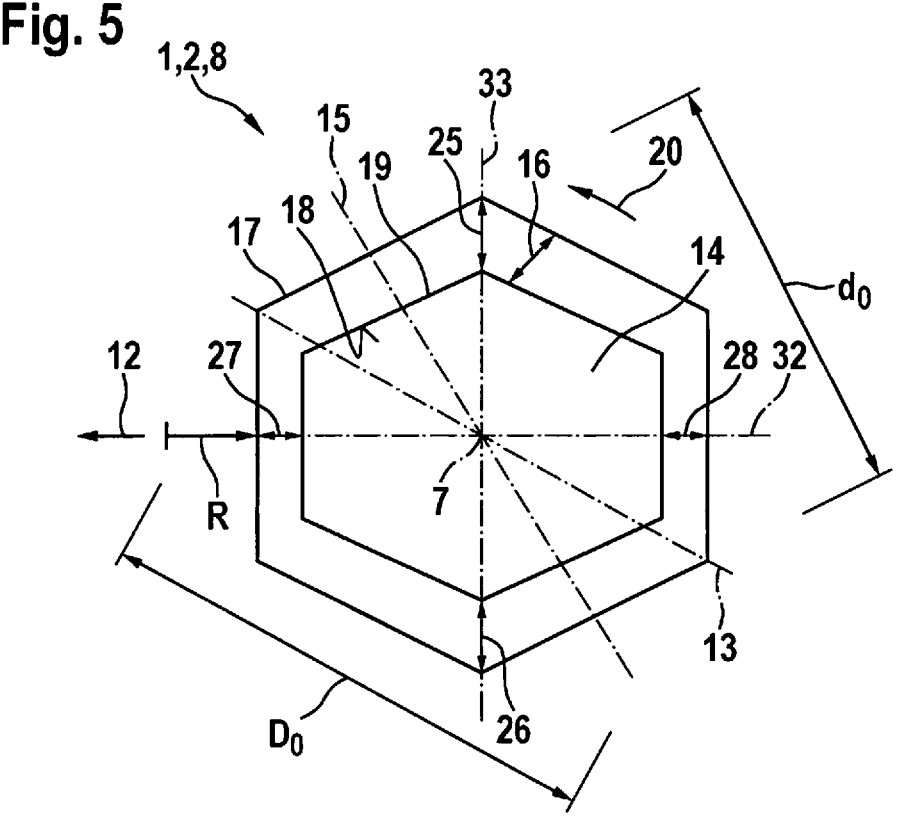

FIG. 5 shows a cross section 8 of tubular base body 2 of component 1 illustrated in FIG. 1 according to another example embodiment. In this exemplary embodiment, cross section 8 is formed from a hexagonal hollow body profile. The hexagonal structure is in this case predefined for outer contour 17 as well as for inner contour 19. Maximum wall thicknesses 25, 26 result in this case on an axis 33 which extends perpendicularly to curvature direction 12. Minimum wall thicknesses 27, 28 result on an axis 32 which is oriented along curvature direction 12. Axis 15, on which initial minimum overall dimension do lies, and axis 13, on which initial maximum overall dimension Do are not congruent with axis 32 or axis 33, respectively, in this case. However, axes 32, 33 are oriented perpendicularly in relation to each other.

Not only steels, such as carbon steels or stainless steels, but also other materials can be used as the material for tubular base body 2. For example, other metals can also be used. In the particular application, plastic-based materials or suitable composites can be used.

The present invention is not limited to the described exemplary embodiments.

What is claimed is:

1. A method for manufacturing a fuel injection system component that includes a base body that includes at least one tubular section that is bent in a bending region along a longitudinal axis of the base body, the longitudinal axis perpendicularly intersecting cross sections of the tubular section, the method comprising:
 prior to bending the base body at the bending region:
  forming from a hexagonal hollow body profile the cross sections;
  forming the tubular section with, at the bending region, at least one of:
   for each one of the cross sections, maximum wall thicknesses that lie at least approximately on an axis oriented perpendicularly to a curvature direction of the longitudinal bending and minimum wall thicknesses that lie at least approximately on an axis oriented along the curvature direction of the longitudinal bending;
   for each one of the cross sections, an initial minimum overall dimension is present on an axis that is not congruent with the axis oriented perpendicularly to the curvature direction of the longitudinal bending; and
   an initial maximum overall dimension is present on an axis that is not congruent with the axis oriented along the local curvature direction of the longitudinal bending; and
 subsequently bending the base body to form the bending region.

2. The method of claim 1, wherein the fuel injection system is a high-pressure fuel injection system.

3. The method of claim 1, wherein an ovality of the cross sections of the tubular section is smaller than five percent at the longitudinal bending.

4. The method of claim 1, wherein a bending angle, about which the longitudinal bending of the tubular section is bent, is greater than 90°.

5. The method of claim 1, wherein curvature radiuses or a bending radius of the longitudinal bending is smaller than 20 mm.

* * * * *